United States Patent Office 3,492,329
Patented Jan. 27, 1970

3,492,329
PROCESS FOR MAKING POLY OXO
ALUMINUM SALICYLATES
Brian K. Davison, Didsbury, Manchester, Victor G. Bashford, Sale, and Stanley Gordon Kemp, Brooklands, Sale, England, assignors to Hardman & Holden Limited, Manchester, England, a British company
No Drawing. Continuation-in-part of application Ser. No. 19,464, Apr. 4, 1960. This application Aug. 18, 1965, Ser. No. 480,796
Claims priority, application Great Britain, Apr. 13, 1959, 12,396/59
Int. Cl. C07f 5/06
U.S. Cl. 260—448                                2 Claims

---

ABSTRACT OF THE DISCLOSURE

This invention relates to organic aluminum compounds and to methods of preparing such compounds.

---

This is a continuation-in-part of application Ser. No. 19,464, filed Apr. 4, 1960 and now abondoned.

It is known that some pharmacological active substances possess undesirable characteristics and undesirable physiological side effects. These undesirable effects usually become noticed or pronounced when the pharmacologically active substance is administered to a patent in high dosage or when a prolonged course of dosages is taken. These undesirable characteristics, which naturally vary with the type of pharmacologically active substance, include unpleasant taste and the causing of physiological effects, such as stomach ulcerations, nausea, spasms of vomiting and sometimes coma.

Further, it is known that certain pharmacological active substances possess physical disadvantages, such as susceptibility to moisture of atmospheric oxidation. We are aware that others have attempted to overcome both these types of disadvantage by combining the pharmacologically active substance with a metal to give a metal compound. Where these metal compounds have been aluminum compounds they have had only a limited success. Generally, the compounds prepared have been basic aluminum salts, that is, compounds of the formulae

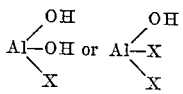

where X represents a residue of a pharmacologically active compound, or mixtures thereof. These compounds have been prepared when X is a carboxylic acid residue by the neutraliziation of the pharmacologically active substance by an aluminum hydroxide gel. This method has given products of variable chemical composition because of variation in the neutralizing capacity and physical characteristics of the aluminum hydroxide gel.

It is known to produce an aluminum acetylsalicylate from aluminum chloride by reaction with sodium aspirin in the presence of an excess of sodium carbonate.

According to the present invention, polymeric aluminum compounds are prepared by heating and reacting pharmacologically active susbtances containing one or more of the following groups—hydroxyl, carboxyl, acid amide, or imide groups with aluminum alcoholates or polymeric derivatives thereof and water.

It is stated that the pharmacologically active substance to which the invention is preferably applicable is aspirin. Other substances also applicable are salicyclic acid and its esters, p-aminosalicylic acid, barbituric acid and its substitution products, lactic acid, ascorbic acid, acetanilide, phenacetin, testosterone, chloral hydrate, tribromethanol, trichlorotert-butanol, penicillins and other antibiotics, nicotinamide, nicotinic acid, ephedrine, and sympathomimetic substances of the adrenaline type, atropine and some of its analogues.

The compounds which are the subject of this invention are condensed aluminum compounds believed to be of the empirical formula

where

X = a residue of a pharmacologically active substance or substances or a hydroxyl group
Y = hydroxyl group or X
$q = 1$ or $0$
$p =$ a whole integer As $p$ becomes large, the formulation, as determined by chemical analysis tends towards

The preferred aluminum alcoholates which may be used in this invention are those which are soluble in organic solvents, and include such alcoholates as those derived from isopropyl, n-propyl, n-butyl, sec-butyl, and tertiary butyl alcohols; others which can be used with good results include those derived from the monoethyl ether of ethylene glycol, cyclo-hexanol, and hexyl alcohol, alone or in admixture.

When $p=1$, it is preferred that the pharmacologically active substance is reacted with an aluminum alcoholate and water in the presence of a solvent, thereby liberating alcohol and causing condensation in situ.

Reaction is brought about by adding a solution of the pharmacologically active substance in a solvent to the aluminum alcoholate in a solvent after the aluminum alcoholate has been caused to react with water or by adding the substance concurrently with the water preferably in a solvent. Also, the pharmacologically active substance can be dissolved in a solvent and the required amount of water added to this solution and the whole run into the aluminum alcoholate in a solvent.

Although it is desirable to have all the reactants dissolved in solvents so that a homogeneous reaction mixture is obtained, it is possible to add the pharmacologically active substance in the form of a slurry or finely divided powder and still obtain adequate yields of the products. Also, when the pharmacologically active substance is a liquid it is possible to omit the solvent.

In carrying out this reaction, the amount of water added is critical. It is known that if water is added to an aluminum alcoholate, the alcohol forming the alcoholate is liberated and an equivalent amount of a hydroxyl compound is formed. For instance, when three moles of water are added to one mole of aluminum isopropoxide, one mole of aluminum hydroxide is formed and three moles of isopropanol are liberated.

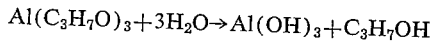

Likewise, if one mole of water is added to one mole of an aluminum diacylate mono-alkoxide a basic aluminum salt is formed:

To form compounds of the formula:
$(Y_2AlO)(XAlO)(AlY_2)$ as stated in the above, it is essential that only ⅔ of a mole of water is reacted per mole of aluminum alkoxide used (i.e., two moles of water per three moles of aluminum alkoxide). On heating the resultant reaction product to a temperature above the boiling point of the alcohol which formed the alkoxide, the liberated alcohol is distilled off and it is found that ⅘ of a mole of the alcohol are liberated, i.e., 4 moles of alcohol per three moles of aluminum alkoxide. It should be noted that this amount of water, i.e., ⅔ of a mole per mole of aluminum alkoxide, is the amount of water needed to bring about the aluminum to oxygen polymerization only, and if it is required to have the grouping Y as an hydroxyl group, extra water in the ratio of 1 mole to 1 mole of Y has to be added.

When it is desired to have values of $p$ greater than 1, proportionately larger amounts of water than ½ of a mole are used to bring about the aluminum to oxygen polymerization. The maximum allowable amount of water which can be added to effect polymerization of the aluminum alcoholate is one mole of water per mole of aluminum alcoholate. Below the lower limit of 0.5 mole water to 1 Al alkoxide compounds will be prepared which are mixtures of the desired formulations of the present invention and the aluminum alkoxide pharmacologically active compound.

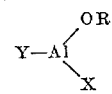

where OR represents an alkoxy grouping. Also, above the upper limit of 1 mole water to 1 mole of Al alkoxide compounds will be prepared which are mixtures of the desired formulation of the present invention

and a dihydroxy aluminum compound $$X \cdot Al(OH)_2$$

When it is required to form compounds where $p$ is large compared with $q$ and in consequence the formulation tends to

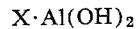

it is desirable to form a polyoxo aluminum alkoxide in the manner described in British patent specification No. 806,113 or British patent specification No. 825,878, and to react tris with the pharmacologically active substance in a solvent. The alcohol which is liberated in the reaction may be distilled off. When this method of preparation is used the pharmacologically active substance dissolved in a solvent can be added to the polyoxo aluminum alkoxide dissolved in a solvent, or the polyoxo aluminum alkoxide dissolved in a solvent can be added to the pharmacologically active substance in a solvent. Where the pharmacologically active substance is a liquid it is possible to omit the solvent in the reaction. It is possible to cause the aluminum polyoxo alkoxide in a solvent or in liquid form to react with a finely powdered or crystalline form or a suspension in a liquid of a pharmacologically active substance. Likewise, a finely powdered form or suspension in a liquid of polyoxo aluminum alkoxide may be caused to react with a pharmacologically active substance in a solvent if the substance is a solid or with or without a solvent if the substance is a liquid.

It is advantageous in all these methods to stir the reaction mixture, although it is not absolutely necessary. The resultant polymeric aluminum compound is obtained by removal of the liberated alcohol and solvents by distillation under reduced pressure to enable the solvent or solvents to be removed at as low a temperature as possible. In some cases, the resultant aluminum compound is insoluble in the solvent system used, and it is possible to recover the aluminum compound by filtration from the solvent mother liquors.

These aluminum compounds possess little or no taste and overcome any unpleasant taste which the pharmacologically active substance may have had. When the aluminum is combined with an acidic pharmaceutical substance such as aspirin, on hydrolysis, an excess of hydroxyl groups is produced over that required to neutralize the pharmaceutical substance, thereby preventing an undesirable state of acidity and in view of this these compounds show advantage over the pharmacologically active compound in preventing any undesirable secondary effects due to extra acidity. Further, as in the compounds of this invention, the proportion of OH groups can be modified, the "antacid" properties becoming more pronounced the greater the proportion of OH groups attached to the aluminum atoms, it is possible to provide compounds with different proportions of built-in "antacid" properties.

The compounds of this invention are not rapidly hydrolyzed by the dilute hydrochloric acid of similar strength as found in the stomach of humans. Since compounds of the present invention are not immediately hydrolyzed a more prolonged action may be obtained than when the pharmacologically active compound is administered orally in other forms.

It will be appreciated that in connection with polymeric aluminum acetylsalicylate of the present invention the fact that there is considerably less hydrolysis in the stomach permits much of the compound to reach the intestines where it may be suitably absorbed. For a comparison of the degree of hydrolysis of the compound of the present polymeric aspirin with other hydrated aspirins in N/20 HCl, the following result are presented:

| Time (min.) | Aspirin compound of the present invention | Hydrated aspirin |
| --- | --- | --- |
| 5 | 14.8 | 38.5 |
| 10 | 17.4 | 39.7 |
| 20 | 20.0 | 52.8 |
| 30 | 21.7 | 62.6 |
| 60 | 27.0 | 75.2 |
| 90 | 31.3 | 85.6 |
| 120 | 33.1 | 90.5 |

It should be understood that the examples given below are only illustrative of the compounds of the present invention and of methods of preparing them.

EXAMPLE 1

A polyoxo aluminum acetylsalicylate where $p$ is very large and the formulation tends to

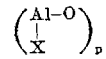

Acetyl salicylic acid (12.5 g.) dissolved in absolute alcohol (120 ml.) by gentle warming to 70° C. is added dropwise with constant stirring to polyoxo aluminum isopropoxide (7.5 g.) dissolved in toluene (200 ml.) held at 70° C. in a reaction vessel fitted with a stirring mechanism, a thermometer, and a still head leading to a downward water cooled condenser. On completion of the addition the reaction mass is stirred for a further 15 minutes with the internal temperature at 70° C. Then a high vacuum is applied and the solvents removed at as low a temperature as possible. The product 15.7 gm., is a fine white powder.

EXAMPLE 2

A polyoxo aluminum barbiturate, where $p$ is very large and for formulation tends to

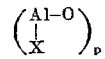

Barbituric acid (57.2 gm.) is added to polyoxo aluminum isopropoxide (44 gm.) dissolved in xylene (157 ml). The mixture is then heated at 125–130° C. with agitation whilst a distillate of isopropanol is slowly liberated. After three hours the solvent and any other liberated isopropanol are removed by heating under a vacuum. This is continued until the product is at constant weight and gives 81.6 gm. of a white powder, a polyoxo aluminum barbiturate.

EXAMPLE 3

A polyoxo aluminum acetylsalicylate

where Y=OH and X=acetylsalicylate.

A suspension of acetyl salicylic acid (349 gm.) in isopropanol (120 ml.) and water (70 ml.) is added to aluminum isopropoxide (1187 gm.) in isopropanol (800 ml.) with stirring. The temperature of this mixture is kept at 85° C. for thirty minutes. After this, water (70 ml.), in isopropanol (400 ml.) is added and the temperature again maintained at 85° C. for a further thirty minutes. Again (70 ml.) of water in isopropanol (400 ml.) is added and the temperature maintained at 85° C. for thirty minutes. Stirring is maintained throughout. The liberated alcohol and the solvent alcohol are removed by distillation and finally by distillation under vacuum, the bath temperature not exceeding 120° C. The resulting polyoxo aluminum acetylsalicylate is a fine white powder weighing 707.1 gm.

EXAMPLE 4

A polyoxo aluminum acetaylsalicylate $$(Y_2AlO).(XAlO).(AlY_2)$$

where

Y=X

X=acetylsalicylate

A solution of acetyl salicylic acid (450 gm.) in isopropanol (1800 ml.) and water (18 gm.) at 70° C. is added to aluminum isopropoxide (306 gm.) in isopropanol (200 ml.) with stirring. The temperature of this mixture is kept at 85° C. for one hour. Stirring is maintained throughout. The liberated alcohol and the solvent alcohol are removed by distillation and finally by distillation under vacuum, the bath temperature not exceedingly 120° C. The resulting polyoxo aluminum acetylsalicylate is a fine white powder weighing 530 gm. Alternatively the product could be separated by filtering and drying at 60° C.

EXAMPLE 5

A polyoxo aluminum ephedrine oxide, when $p$ is very large and the formulation tends to

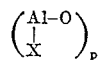

Anhydrous ephedrine (14.22 gm.) dissolved in benzene (100 ml.) by warming to 70° C. is added slowly with constant stirring to polyoxo aluminum isopropoxide (8.78 gm.) dissolved in toluene (50 ml.). The reaction mass is now refluxed for two hours. The solvents and any liberated isopropanol are removed by heating under a vacuum. This is continued until the product is at constant weight giving 19.0 gm. of a light brown brittle solid.

EXAMPLE 6

A polyoxo aluminum nicotinate, where $p$ is very large and the formulation tends to

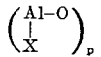

Nicotinic acid (13.75 gm.) is added to polyoxo aluminum isopropoxide (11.4 gm.) dissolved in a mixed solvent, toluene (50 ml.) and isopropanol (100 ml.). The mixture is then refluxed for one hour at 100–110° C. with agitation. After this period of time the solvents and any liberated isopropanol are removed by heating under a vacuum. This is continued until the product is at constant weight giving 19.9 gm. of a brittle, easily powdered white solid, a polyoxo aluminum nicotinate.

EXAMPLE 7

A polyoxo aluminum trichloro-tert-butoxide $$(Y_2AlO) \cdot (XAlO) \cdot (AlY_2)$$

where

Y=X and

X=trichloro-tert-butylalcohol

Anhydrous trichloro-tert-butylalcohol (164.0 gm.) dissolved in benzene (300 ml.) and water (6.68 gm.) is added to aluminum isopropoxide (113.5 gm.) in isopropanol (500 ml.) with stirring. The temperature of this mixture is kept at 85° C. for one hour. Stirring is maintained throughout. The liberated alcohol and solvents are removed by distillation and finally by distillation under vacuum, the bath temperature not exceeding 120° C. This is continued until the product is at constant weight giving 180 gm. of a white solid.

EXAMPLE 8

A polyoxo aluminum trichloro-tert-butoxide where the formulation tends to

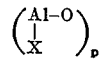

that is where $p$ is very large.

Anhydrous trichloro-tert-butyl alcohol (31.4 gm.) dissolved in benzene (100 ml.) is added with constant stirring to polyoxo aluminum isopropoxide (18.06 gm.) dissolved in toluene (100 ml.) held at 70° C. in a reaction vessel fitted with a stirring mechanism and a reflux condenser. On completion of the addition the reaction mass is stirred for two hours, the solution being kept at the boil. Then vacuum is applied and the solvents and any liberated isopropanol removed. This is continued until the product is at constant weight. The product 35.8 gm., is a brittle off-white solid.

EXAMPLE 9

A polyoxo aluminum ascorbate $(Y_2AlO) (XAlO) (AlY_2)$ where

Y=X

X=l··Ascorbic acid (Vitamin C)

Ascorbic acid (17.3 gm.) dissolved in isopropyl alcohol (500 ml.) and water (0.7 gm.) is added to aluminum isopropoxide (12.0 gm.) dissolved in isopropyl alcohol (50 ml.) and held at 50–60° C. The aluminum compound precipitates out upon addition of the ascorbic acid and water solution. The solvent is removed by distillation under vacuum with a maximum heating temperature of 60° C. The resulting polyoxo aluminum ascorbate is a white powder weighing 19.2 gm.

EXAMPLE 10

A polyoxo aluminum chloral hydrate $(Y_2AlO) (XAlO) (AlY_2)$ where

X=Chloral hydrate and

Y=Chloral hydrate or an OH group

Chloral hydrate (25.2 gm.) and water (3.65 gm.) dissolved in n-butanol (250 ml.) is run into a solution of aluminum sec-butoxide (74.8 gm.) in n-butanol (100 ml.) at 80° C. On completion of the addition a further (3.65 gm.) of water in n-butanol (100 ml.) is added and the whole heated at 80° C. for half-an-hour. The product which precipitates out is filtered off and dried under vacuum at 60° C. The resulting polyoxo aluminum chloral hydrate is a white powder weighing 36 gm.

EXAMPLE 11

A polyoxo aluminum p-amino salicylate $(Y_2AlO) (XAlO) (AlY_2)$ where

Y=X and

X=p-amino salicylate

A hot solution of p-amino salicylic acid (153 gm.) and water (7.2 gm.) in isopropyl alcohol (2-litres) is added to aluminum isopropoxide (122 gm.) in isopropyl alcohol (100 ml.) with stirring. The mixture is further heated with stirring for half-an-hour. The polyoxo-aluminum p-aminosalicylate precipitates out from the solution and is filtered off and dried under vacuum at 50° C. The resulting polyoxo-aluminum p-aminosalicylate is a cream powder weighing 170 gm.

EXAMPLE 12

A polyoxo aluminum p-amino salicylate where $p$ is very large and the formulation tends to

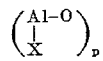

A hot solution of p-aminosalicylic acid (153 gm.) in isopropyl alcohol (2-litres) is added to polyoxo aluminum isopropoxide (102.0 gm.) dissolved in toluene (1000 ml.) with stirring. The mixture is then warmed at 80° C. for one hour with agitation. After this period of time the solvents and the liberated isopropanol are removed by heating under a vacuum. This is continued until the product is at constant weight, giving 198 gm. of a buff coloured solid, a polyoxo aluminum p-aminosalicylate.

EXAMPLE 13

A polyoxo aluminum acetyl salicylate $(Y_2AlO)_q$ $(XAlO)_p (AlY_2)_q$ where $q=1$
$p=6$
$Y=X$ and
$X=$acetyl salicylic acid A solution of acetyl salicylic acid (180 gm.) in isopropanol (600 ml.) and water (12.6 gm.) at 70° C. is added to aluminum isopropoxide (163 gm.) in isopropanol (200 ml.) with stirring. The mixture is kept at 85° C. for one hour and stirring is maintained throughout. The product which precipitates out from the solution is filtered off and dried. The resulting polyoxo aluminum acetylsalicylate is a white powder weighing 207 gm.

EXAMPLE 14

A polyoxo aluminum penicillinate $(Y_2AlO)$ $(XAlO)$ $(AlY_2)$ where $Y=X$ and
$X=$penicillin Sodium penicillin G (6 gm.) dissolved in water (40 ml.) and with chloroform present (40 ml.) all at 0–5° C. is converted into the acid form by acidification to pH 2 by the addition of 2 N hydrochloric acid. The chloroform layer is separated, run into an ice-cooled flask and dried by anhydrous magnesium sulphate. The aqueous layer is re-extracted with chloroform and this chloroform is likewise separated, dried and then combined with the first extract. These chloroform extracts are then run into a stirred solution of aluminum isoproxide (2.295 gm.) in dry isopropanol (200 ml.) concurrently with a solution of water (0.12 gm.) in isopropanol (100 ml.), the whole being at 30° C. The aluminum penicillin compound precipitates out from the solution and is filtered off said dried in vacuo at room temperature to give a white powder, aluminum polyoxo-penicillinate, 5.8 gm.

It will be apparent that many changes and modifications may be made without departing from the spirit and scope of the invention. It is therefore apparent that the foregoing description is by way of illustration of the invention rather than limitation of the invention.

What is claimed is:

1. A process for making polymeric organic aluminum compounds consisting essentially of heating and reacting an aluminum alkoxide derived from an alcohol having up to 6 carbon atoms, water and a pharmacologically active substance selected from the group consisting of salicylic acid, acetylsalicylic acid and p-aminosalicylic acid until a polymeric product is obtained, and removing the liberated alcohol.

2. A process for making polymeric organic aluminum compounds consisting essentially of heating and reacting an aluminum alkoxide derived from an alcohol having up to 6 carbon atoms with water until 2 moles of the alcohol corresponding to the alkoxide have been liberated per mole of water added to form a poly-aluminum oxoalkoxide; heating and reacting said poly-aluminum-oxoalkoxide in the presence of at least one organic solvent with a pharmacologically active substance selected from the group consisting of salicylic acid, acetylsalicylic acid and p-aminosalicylic acid and removing the alcohol which is liberated.

References Cited

UNITED STATES PATENTS

| 2,686,800 | 8/1954 | Brown et al. | |
| 2,698,332 | 12/1954 | Beekman. | |
| 2,844,551 | 7/1958 | Orthner et al. | |
| 2,918,485 | 12/1959 | Schenck et al. | |
| 2,925,430 | 2/1960 | Stedehouder et al. | 260—448 |

OSCAR R. VERTIZ, Primary Examiner

H. M. S. SNEED, Assistant Examiner

U.S. Cl. X.R.

260—239.1, 257, 258, 295, 292, 343.7, 397.4